US007610690B2

(12) United States Patent
Fischer

(10) Patent No.: US 7,610,690 B2
(45) Date of Patent: Nov. 3, 2009

(54) MEASUREMENT STAND FOR HOLDING A MEASURING INSTRUMENT

(75) Inventor: Helmut Fischer, Sindelfingen (DE)

(73) Assignee: Immobiliengesellschaft Helmut Fischer GmbH & Co. KG, Sindelfingen (DE)

( * ) Notice: Subject to any disclaimer, the term of this patent is extended or adjusted under 35 U.S.C. 154(b) by 0 days.

(21) Appl. No.: 11/490,382

(22) Filed: Jul. 20, 2006

(65) Prior Publication Data

US 2007/0017112 A1  Jan. 25, 2007

(30) Foreign Application Priority Data

Jul. 20, 2005  (DE)  ........................ 10 2005 034 515

(51) Int. Cl.
*G01B 5/02* (2006.01)

(52) U.S. Cl. ............................. 33/832; 33/834; 33/572

(58) Field of Classification Search ........... 33/832–838, 33/503, 549, 572, 556, 558, 559, 561, 1 M; 700/193, 195

See application file for complete search history.

(56) References Cited

U.S. PATENT DOCUMENTS

| 4,498,241 | A | * | 2/1985 | Nakaoki | ........................ 33/832 |
| 4,679,326 | A | * | 7/1987 | Takizawa et al. | ............... 33/832 |
| 4,766,674 | A | * | 8/1988 | Zanier et al. | ................... 33/503 |
| 4,825,557 | A | * | 5/1989 | Nettleton et al. | ............... 33/502 |
| 4,845,855 | A | * | 7/1989 | Meyer | ......................... 33/832 |
| 4,924,598 | A | * | 5/1990 | Gruhler | ....................... 33/832 |
| 6,011,391 | A | * | 1/2000 | Nix et al. | ..................... 324/230 |
| 6,401,352 | B1 | * | 6/2002 | Kimura et al. | ................ 33/832 |
| 6,604,295 | B2 | * | 8/2003 | Nishimura et al. | ............ 33/554 |
| 6,901,678 | B2 | * | 6/2005 | Kubota | ........................ 33/551 |
| 7,024,273 | B2 | * | 4/2006 | Tsuboi et al. | ............... 700/195 |
| 7,076,883 | B2 | * | 7/2006 | Yamamoto et al. | ............ 33/556 |
| 2003/0047388 | A1 | * | 3/2003 | Faitel | ......................... 187/214 |
| 2007/0017112 | A1 | * | 1/2007 | Fischer | ........................ 33/832 |

* cited by examiner

*Primary Examiner*—Amy Cohen Johnson
(74) *Attorney, Agent, or Firm*—Kriegsman & Kriegsman

(57) ABSTRACT

A measurement stand for holding a measuring device (26), in particular a measuring arrangement (26) for measuring the thickness of thin layers, said measurement stand comprising a housing (18) in which a cam follower (23) is guided such that it can be moved up and down and the measuring device (26) is arranged at that end of said housing (18) that faces the measuring object (14), wherein a drive unit (29) with an electric drive (28) drives the lifting movement of the cam follower (23), wherein said drive unit (29) initiates in the down movement at least one first movement phase with a rapid motion and at least one further movement phase of the cam follower (23) with a creep motion until the measuring device (26) touches down on the measuring object (14).

23 Claims, 6 Drawing Sheets

MEASUREMENT STAND FOR HOLDING A MEASURING INSTRUMENT

The invention relates to a measurement stand for holding a measuring device, in particular a measuring device for measuring the thickness of thin layers, said measurement stand comprising a housing in which a cam follower is guided such that it can be moved up and down and the measuring device is arranged at that end of said housing that faces the measuring object.

Such a measurement stand is, for example, used for the measurement of layer thicknesses. For the purpose of measuring the thickness of thin layers, a measuring object is positioned on a measuring table of the measurement stand. A measuring device is provided at that end of a cam follower that faces the measuring object, wherein said cam follower can be moved up and down. The up and down movement of the cam follower is achieved manually, being initiated by swinging a lever.

Layer thicknesses can be measured by utilizing a magnetic inductive method or an eddy current method. Which method is used, depends on the basic material and the layers to be measured. For example, the magnetic inductive method is used for non-magnetic layers on ferromagnetic substrate materials. Where electrically non-conducting layers on ferrous metals are concerned, use is made of the eddy current method.

In layer thickness measurement, it is essential that, after the measurement has been completed, the measuring probe is lifted for a specific lifting distance in relation to the surface of the measuring object, in order to ensure that the low-frequency or high-frequency magnetic alternating field of the measuring probe is not affected by the measuring object in an initial position prior to commencement of the measurement.

Since the lifting movement is controlled manually, the measuring probe touches down on the measuring object at various speeds and, thus, with different forces. As a result, measurement values that are falsified by improper handling might be detected.

For that reason, the invention aims at creating a measurement stand which, particularly for measuring the thickness of thin layers, enables the measuring device to touch down on the surface to be measured in a gentle manner, so that exact measurement values can be obtained, and which measurement stand comprises a high repeatability.

This problem is solved by the invention by means of a device according to the elements of claim 1. Further advantageous embodiments of the invention are specified in the further claims.

The measurement stand according to the invention is advantageous in that lowering in a controlled manner is enabled by at least one down movement of the cam follower with a first movement phase in the rapid mode and at least one second movement phase in the creep mode. In particular, the at least one further movement phase in the creep mode lasting until the measuring device touches down on the measuring object is advantageous in that said touchdown is achieved at a slow speed, thus enabling the measuring device, particularly the measuring probe, to touch down on the surface of the measuring object in a gentle manner. This touchdown in a gentle manner prevents the surface to be measured from being damaged, wherein such damage would falsify the measurement values. In addition, said controlled first and at least one further movement phases allow uniform conditions to be created while the measuring device touches down on the surface to be measured, thus achieving a high repeatability of the measurement stand in registering the measurement values.

According to a further advantageous embodiment of the invention, a constant feed speed is provided in the creep mode. This ensures identical preconditions, particularly for the measurement of serial components, even if there are minor changes in the measurement level. The constant feed speed in the creep mode can result in uniform conditions whenever the measuring probe touches down on the surface of the measuring object in repetitious measurements.

The drive unit preferably comprises a cam disk which moves the cam follower up and down. According to a first preferred executive form of the drive unit, it is provided that the cam disk moves the cam follower up and down in a direct manner. To achieve this, a roller resting on the cam disk and assuming a lifting position in relation to the rotational angle of the cam disk can be provided at the cam follower.

According to a further alternative executive form, it is provided that the cam disk moves a pivoted lever up and down, which pivoted lever is arranged at one end of the housing in a stationary manner and engages the cam follower at its other end. Such a cam disk, which is an integral part of the drive unit, permits to initiate at least the first movement phase and a further movement phase. At the same time, such cam disks enable a mechanically simple, however highly precise control. This allows precise initiation of the lifting movement, even after a very long service life or a plurality of cycles.

A roller resting on the cam disk is provided at the pivoted lever, between the pivot of the pivoted lever and a pivoted connection to the cam follower, said pivot being fixed in relation to the housing. This is advantageous in that a very smooth initiation is ensured, wherein the roller which is particularly designed as a roller bearing comprises low coefficients of friction. At the same time, this arrangement is advantageous in that a damage to the surface of the measuring object is given with a potentially improperly set lifting distance or a basic height of the housing in relation to the measuring object. If the measuring device touches down prematurely on the surface of the measuring object while the cam follower is lowered or moves down, the cam disk would continue to run to its end position without any forced down movement that might be caused by the roller just resting on and then being lifted off from the cam disk.

According to a preferred executive form, the roller running off the cam disk is positioned at the pivoted lever such that, while the pivoted lever is moved up and down, said roller is running along a circular path intersecting or at least extending very close to the pivot of the cam disk. As a result, the leverage ratios acting upon the cam disk can be minimized to a considerable extent. Owing to the fact that the pivots are arranged in parallel or quasi in parallel to each other, there are almost no leverages acting upon the cam disk.

According to a preferred executive form of the invention, the cam disk is provided on a pivot receiving a drive wheel directly or indirectly driven by the electric drive motor. This allows creation of structurally simple conditions. Activation of the drive motor immediately enables a movement of the cam disk.

Preferably, a switching element with at least one switching plate is provided at the pivot that receives the cam disk, said switching plate controlling at least one upper and one lower end position of the lifting movement of the cam follower. At least in the upper and lower end positions, the switching plate of the switching element moves across a detector, in particular an optical sensor, thus stopping the drive motor. This allows exact determination of these end positions.

According to a further advantageous embodiment of the invention, it is provided that a further detector, in particular an optical sensor, is provided along a circular path of the switching plate between the detectors comprising the upper and lower end positions. As a result, a first section and a second section of the lifting movement can, for example, be detected and initiated at different speeds by a corresponding drive of the drive motor. Preferably, the cam disk is adjusted to such a change in speed, so that, while a lifting section is initiated at a slow speed, a constant lifting rate is kept at the same time.

Alternatively, the division of the lifting movement via the optical sensor can also be used for adjusting a shortened lifting distance, at least in the first movement phase. To achieve this, further switching segments which are, in turn, assigned to a separate optical sensor are preferrably provided at the switching element. The plurality of switching segments allows an individual adjustment of the lifting distance.

To ensure exact and highly precise guidance of the cam follower, a guide, in particular a plain bearing, is each provided in an upper and a lower wall section on the front side of the housing. Since these two guides, in particular plain bearing bushes, are arranged such that they are spaced apart from each other, the cam follower can be received almost without any tilting.

It is, preferably, provided that the guide of the cam follower is made of bearing bronze and the cam follower comprises a polished or lapped surface. This allows to create guides which are almost free from play and are working precisely and smoothly.

To further increase the precision of the lifting movement and to achieve a high repeatability, it is provided that the pivoted connection between the cam follower and the pivoted lever is formed by a threaded bolt which is running in a deep hole of the pivoted lever. Said deep hole enables the pivoted lever to be smoothly received at the lever, even with a long travel.

Preferably, a bearing bush which is guided in the deep hole of the pivoted lever is provided on the threaded bolt. As a result, a reduction in friction force is achieved in this further bearing site.

According to a further advantageous embodiment of the invention, it is provided that the pivoted lever and the cam follower comprise an anti-twist device acting upon the housing. This allows elimination of further tilting moments, which may act upon the cam follower while a lifting movement is in progress.

Preferably, it is provided that the anti-twist device comprises a longitudinal groove which is arranged in the housing and which is used to guide a roller engaging the pivoted connection or the cam follower. This roller prevents the cam follower from twisting because the pivoted lever is, for example, engaging the cam follower on one side. The roller is guided in the guiding groove with only a very small play so that it is possible to achieve an arrangement that is almost free from any play and/or twist when the roller changes its abutment against the guiding surfaces of the guiding groove.

According to a further advantageous embodiment of the invention, it is provided that the cam follower comprises a pressure relief device at an end arranged opposite to the measuring object. This pressure relief device allows an almost force-free up and down movement of the cam follower to which the measuring device is attached in a removable manner. This can support touchdown of the measuring device or measuring probe on the surface in a gentle manner.

Preferably, a tension spring or compression spring is provided, said spring being arranged with a bias. This biasing force can be set in relation to the weight of the measuring device, in order to ensure that the conditions created during application of different measuring devices are always the same.

According to a preferred embodiment of the invention, the measurement stand according to the invention can be manually released for a lowering movement and an up movement of the cam follower. Such a mode allows a test measurement or a check of the setting of the lifting movement for the measurement to be taken or the performance of a manual single measurement wherein the time required by the measuring device for touching down on the surface of the measuring object is defined by the user.

According to an alternative embodiment of the invention, it is provided that a mode allowing the performance of a complete lifting cycle can be set, wherein the dwell time in the touchdown position is, preferably, predefined by a variable time setting. This allows to run through a complete cycle without any manipulation on the operating staff's part, wherein a measuring device is reset to an initial position after completion of a measurement.

According to a further advantageous embodiment of the invention, it is provided that a continuous test can be carried out for repeatedly registering the measurement values on a surface of an object or for testing a plurality of measuring objects which are fed to the measuring probe in cycles. In such a lifting sequence, both the dwell time on the surface to be measured and the dwell time elapsing until a new measurement cycle is started can be adjusted. Moreover, it is possible to adjust the movement speeds in the rapid and creep modes as well as the lifting distance in the rapid mode.

According to a further advantageous embodiment of the invention, it is provided that the lifting movement and/or the lifting cycles can be initiated from an external control unit through an interface provided on the housing. This allows to easily make application-specific modifications.

Below, the invention as well as further advantageous executive forms and further developments thereof will be described and illustrated in more detail by means of the examples represented in the drawings. The elements referred to in the description and the drawings can be applied according to the invention, either separately or combined as desired. In the figures.

Figure 1:
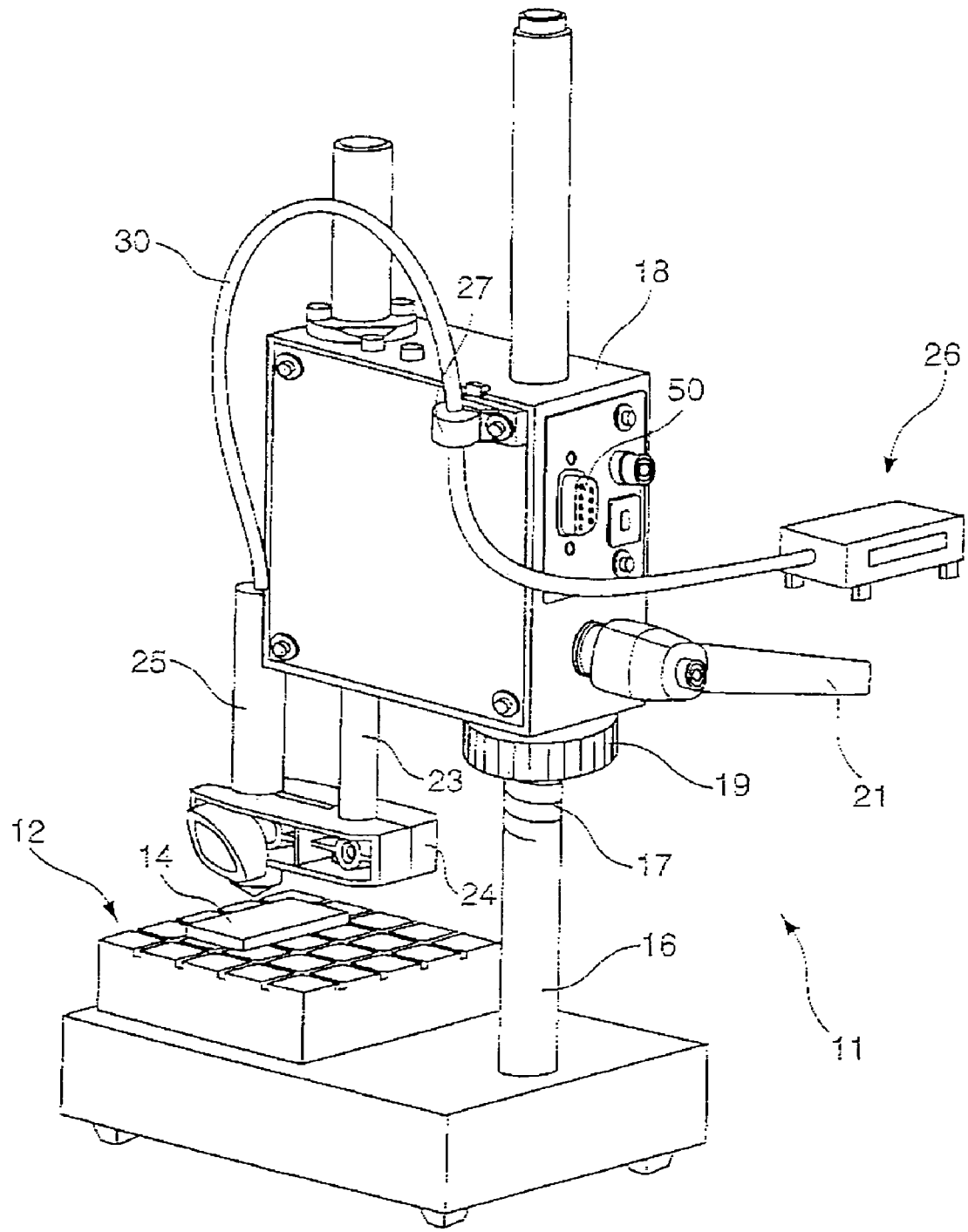
FIG. 1 is a perspective view of a measurement stand according to the invention.

FIG. 1 shows a measurement stand 11 according to the invention. This measurement stand 11 comprises a measurement table 12, onto which individual measuring objects 14 can be positioned and placed. A magnetic sliding table receiving the measuring object is shown in the illustrated instance. A vertical column 16 which holds a housing 18 that can be vertically adjusted via a thread 17 is provided at the foot of the measurement stand 11 or at the measuring table 12. The height of the housing 18 can be adjusted exactly by means of an adjusting screw 19 and a clamping mechanism 21.

The housing 18 receives a cam follower 23 such that the latter can be moved up and down. A holding device 24 which is intended for fixing a measuring device 26 in a removable manner is provided at the lower end of the cam follower 23. The measuring device 26 comprises a measuring probe 25 for the measurement of the thickness of thin layers. This measuring probe 25 touches down on the surface of the measuring object 14 by means of a spherical touchdown cap. An electric line 20 which is running in an upward direction and is, for example, fixed in a clamp-type holder 27 in order to prevent cross interferences during the measurement is provided at the opposite end of the measuring probe 25.

Figure 2:
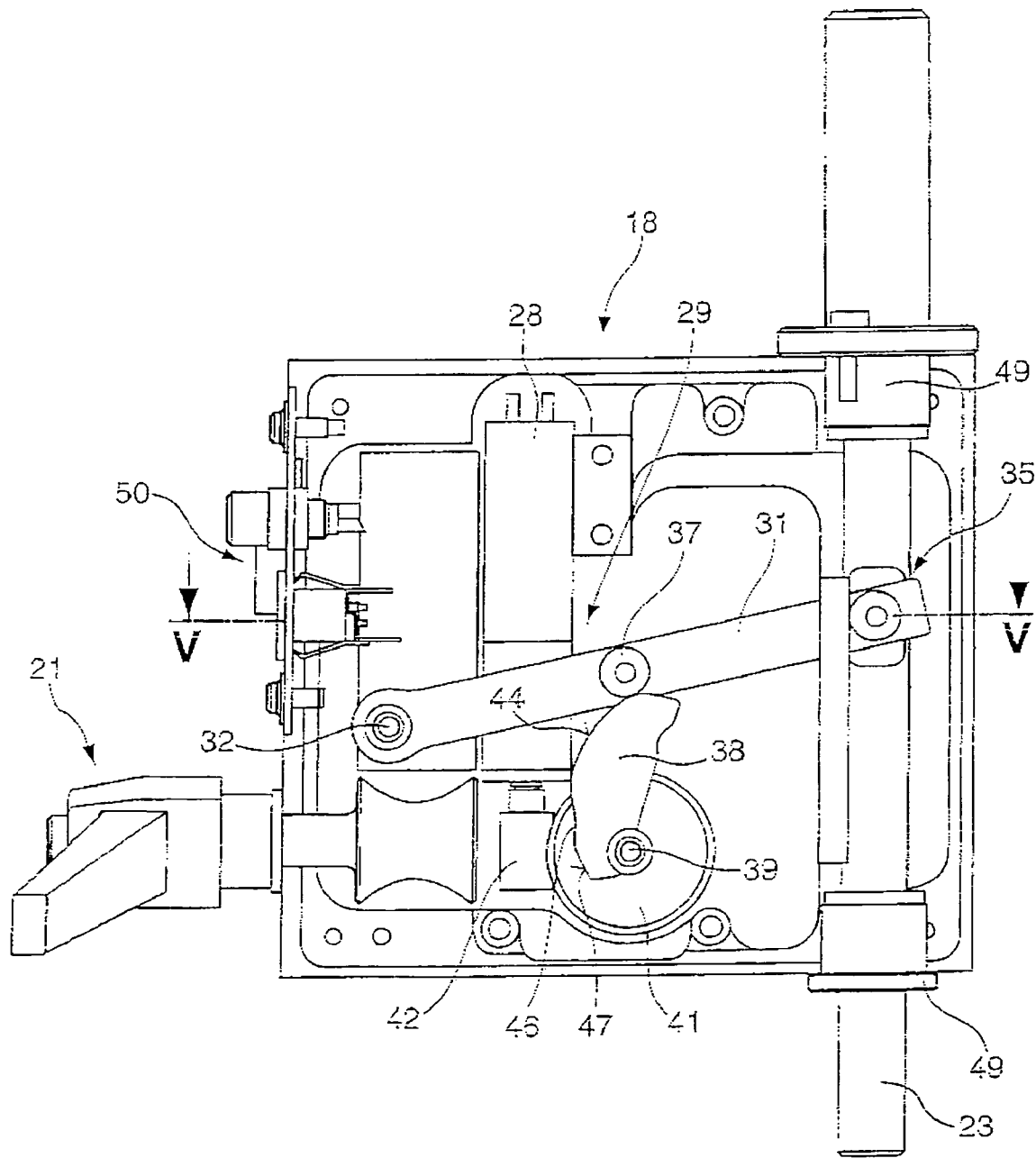
FIG. 2 is a schematic lateral view of a rear wall of the housing of the measurement stand according to FIG. 1.

FIG. 2 is a schematic lateral view of the rear of the housing 18 without rear wall. The cam follower 23 is moved up and down by a drive unit 29 with an electric drive motor 28. To this end, the drive unit 29 comprises a pivoted lever 31 which is, for example, provided in a stationary manner at one end of the housing 18. Preferably, the pivoted lever 31 is supported through a roller or ball bearing 32. At its opposite end, the pivoted lever 31 is attached to the cam follower 23, forming a pivoted connection 35. A further roller 37 which rests on a cam disk 38 is provided in the central region of the pivoted lever 31. The cam disk 38 itself is, in turn, swivel-mounted to a pivot 39. Said pivot 39 receives a drive wheel 41 cooperating with a worm gear 42, wherein the worm gear 42 is in direct communication with the electric drive 28.

The cam disk 38 is designed such that the lifting movement of the cam follower 23 is subdivided in a first movement phase corresponding to a rapid motion and a second movement phase comprising a creep motion. The first movement phase is defined by a curve trace 44 wherein a slope facilitating acceleration and deceleration of the lifting movement from and to the end position is provided at the free end of the curve trace 44. At point 46, the curve trace 44 of the cam disk 38 changes from the rapid or dynamic movement phase to the slow movement phase, wherein the slow movement phase comprises the curve trace 47. This curve trace 47 is adjusted to the position of the roller 37 and is spaced apart from the pivot 39 such that the cam follower 23 is moved towards the surface of the measuring object 14 with a constant lowering movement.

To perform the vertical lifting movement in the housing 18, the cam follower 23 is guided through two guides 49, in particular plain bearing bushes, each of these guides 49 being arranged at each front end of the housing 18. Since the guides 49 are arranged such that they are spaced apart from each other by a relatively long distance, the tilting moment of the cam follower 23 is reduced. At the same time, a guidance that is almost free from play is achieved by the fitting dimensions that are selected between the hole diameter of the guide 49 and the outside diameter of the preferably lapped or polished surface of the cam follower 23.

FIG. 2 shows in more detail the clamping element 21 which comprises a clamping piece penetrating through the column 16 and clamping the housing 18 towards the column 23 via a clamping lever.

Interfaces 50 for external equipment, such as computers for activation of the drive unit 29 and for the supply of energy, are provided at a narrow side of the housing 18.

Figure 3:
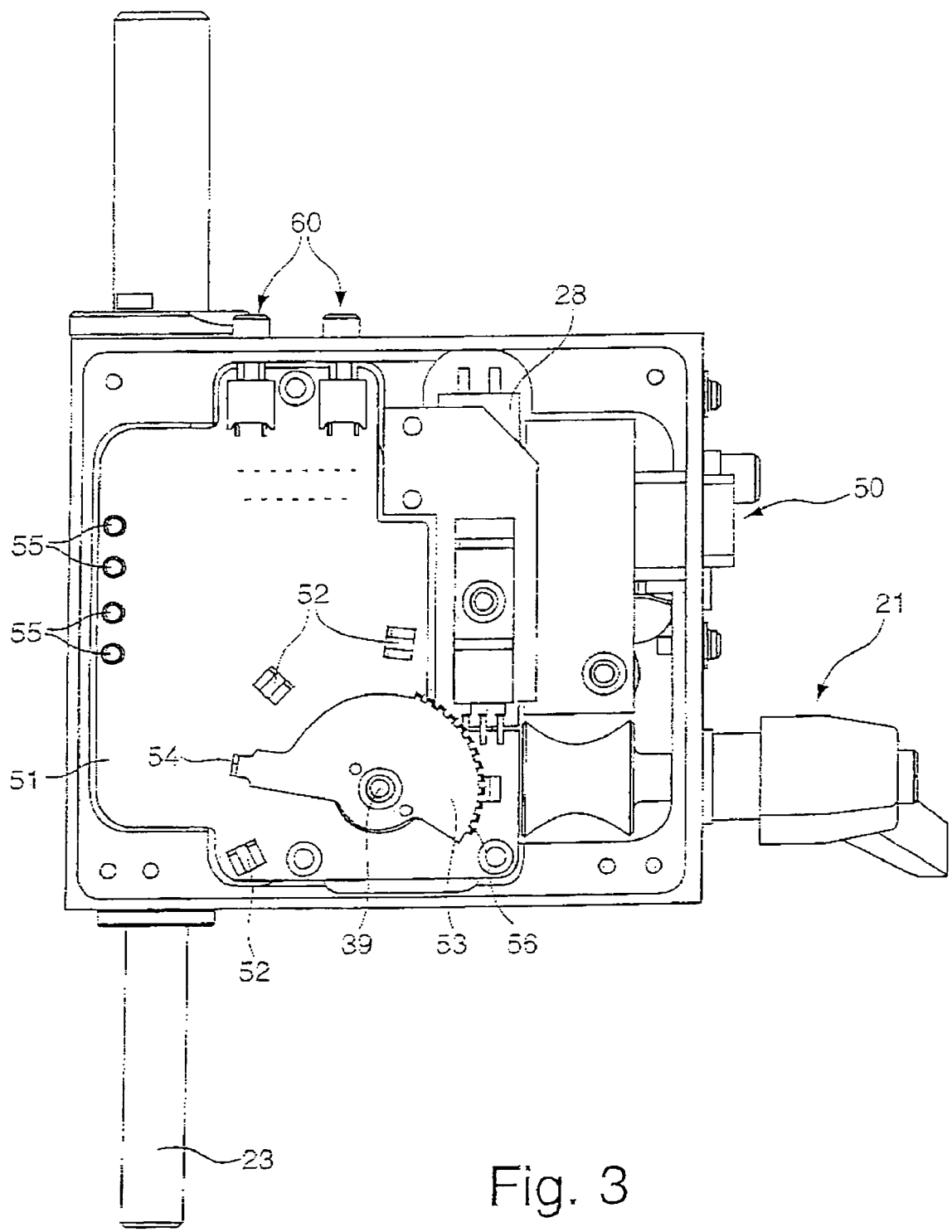
FIG. 3 is a schematic lateral view of the front of the housing after the housing cover has been removed.

FIG. 3 is a schematic front view of a housing 18 wherein the cover or front panel has been removed. A plurality of detectors that are designed as optical sensors 52 are provided on a printed circuit board 51, wherein at least a part of the detectors 52 are positioned on a circular path. Opposite to the cam disk 38, a switching element 53 with a switching plate 54 is arranged at the pivot 39. Said switching plate 54 moves across the detectors 52, wherein the detector 52 arranged on the lower face of the housing 18 corresponds to a lower end position of the cam follower 23 and the uppermost optical sensor 52 corresponds to an upper end position of the lifting cam follower 23. The intermediate detector 52 divides the lifting movement, for example, in a movement phase in the rapid mode and one in the creep mode.

While the movement phase in the rapid mode is in progress, it is possible to set the lifting height. For example, this is achieved through the switching segments 56 which are arranged opposite to the switching plate 54 of the switching element 53 and are also cooperating with a detector 52. Such a switching segment is provided to verify that the set end positions are assumed. Alternatively, it is also possible to exclusively provide electric monitoring means so that, for example, an inquiry is enabled via incremental encoders or linear sensors.

Furthermore, indicator elements 55 are provided on the printed circuit board 51. These indicator elements 55 are, preferably, designed as LEDs and indicate a set operating mode for performing the lifting movements. The various operating modes can be set via pushbuttons 60. For example, a pushbutton 60 can also be provided for initiating a down movement or an up movement. Over and beyond that, it is also possible to program and set the particular operating mode via the interface 50 through external equipment.

Figure 4:
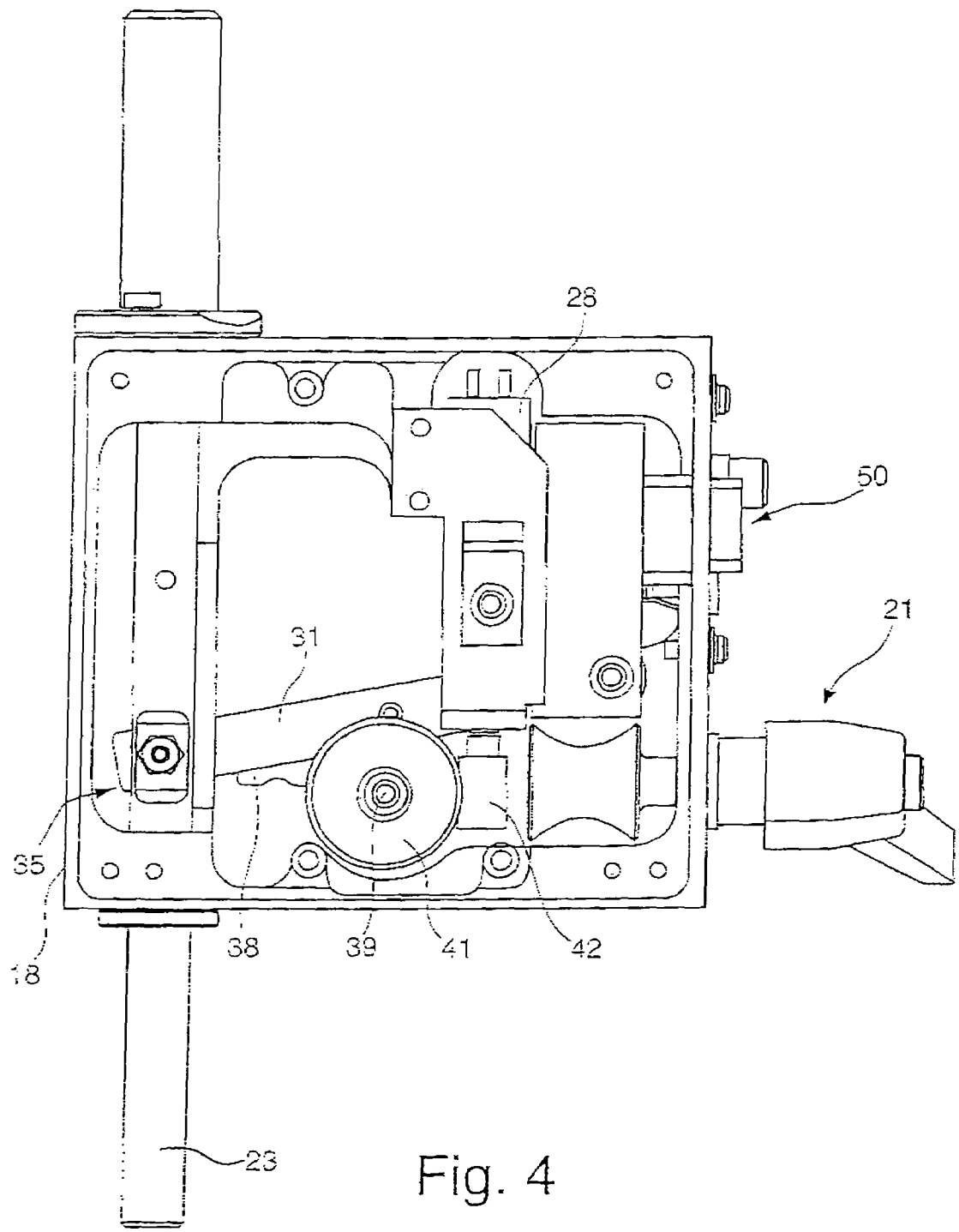
FIG. 4 is a schematic lateral view of the front of the housing after the printed circuit board shown in FIG. 3 has been removed.

FIG. 4 is a further schematic lateral view of the housing 18 wherein the printed circuit board 51 has been removed. In this illustrated instance, the cam follower 23 is in a lower end position, whereas FIG. 2 shows the cam follower 23 almost in its upper end position. The pivoted lever 31 is, accordingly, arranged in a lower position. This is also illustrated by the alignment of the cam disk 38 which is, in essence, aligned in a horizontal direction.

Figure 5:
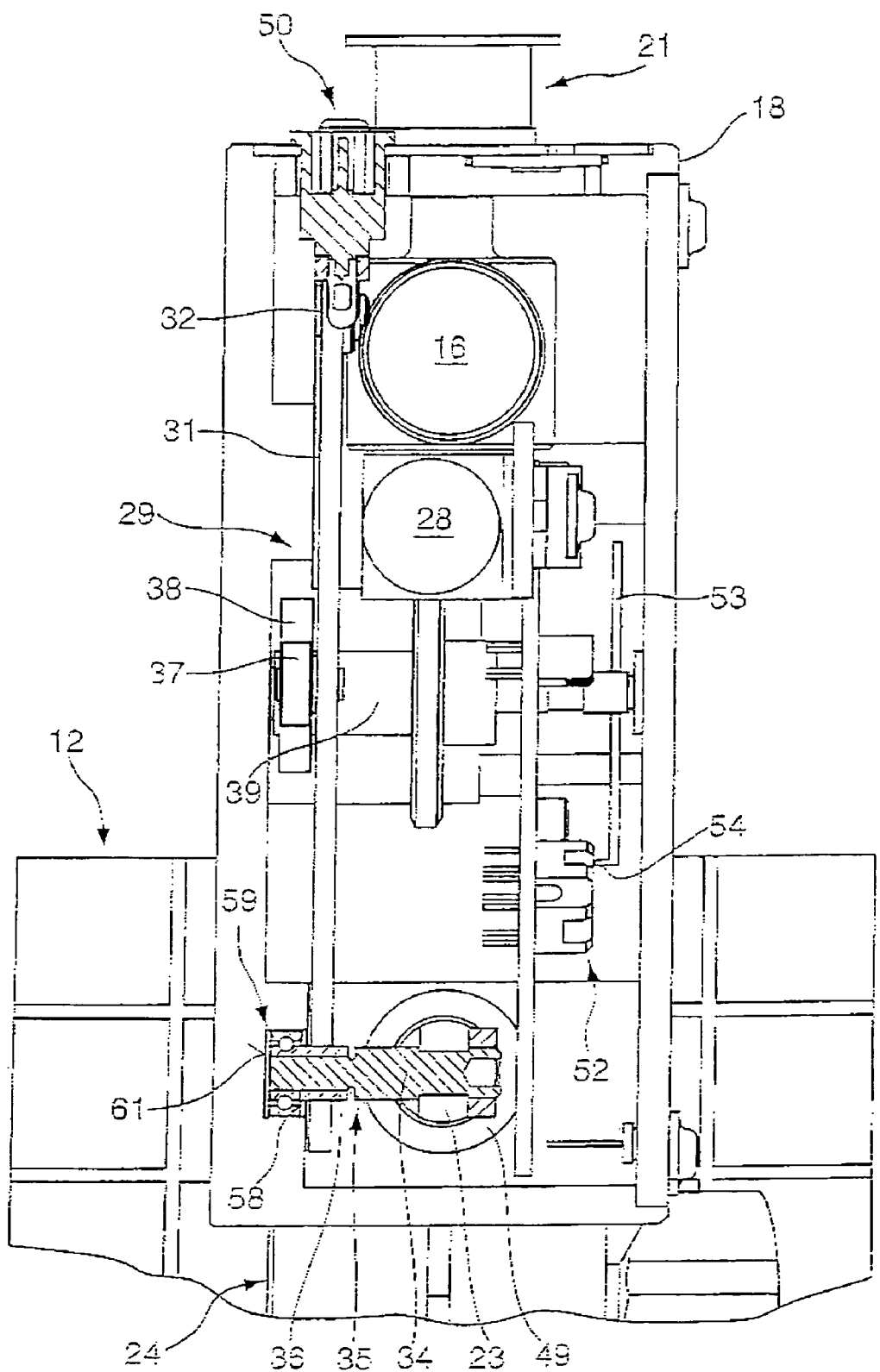
FIG. 5 is a schematic sectional view taken from lines V-V in FIG. 2.

FIG. 5 is a schematic sectional view taken from line V-V in FIG. 2. The pivoted connection 35 between the pivoted lever 31 and the cam follower 23 is established through a threaded pin 34 which passes through the cam follower 23. The threaded pin 34 receives a bearing bush 36, in particular a plain bearing bush, through which the threaded pin 34 is guided in the deep hole 33 of the pivoted lever 31. This reduces friction to a considerable extent. The threaded pin 34 passes through the deep hole 33 and, outside of the deep hole 33, receives a guiding roller 58 which is provided for forming an anti-twist device 59. To achieve this, the guiding roller 58 is guided in a groove 61, thereby excluding a tilting movement via the threaded pin 34 owing to the pivoted lever 31 engages the cam follower 23 in an eccentric manner.

Figure 6:
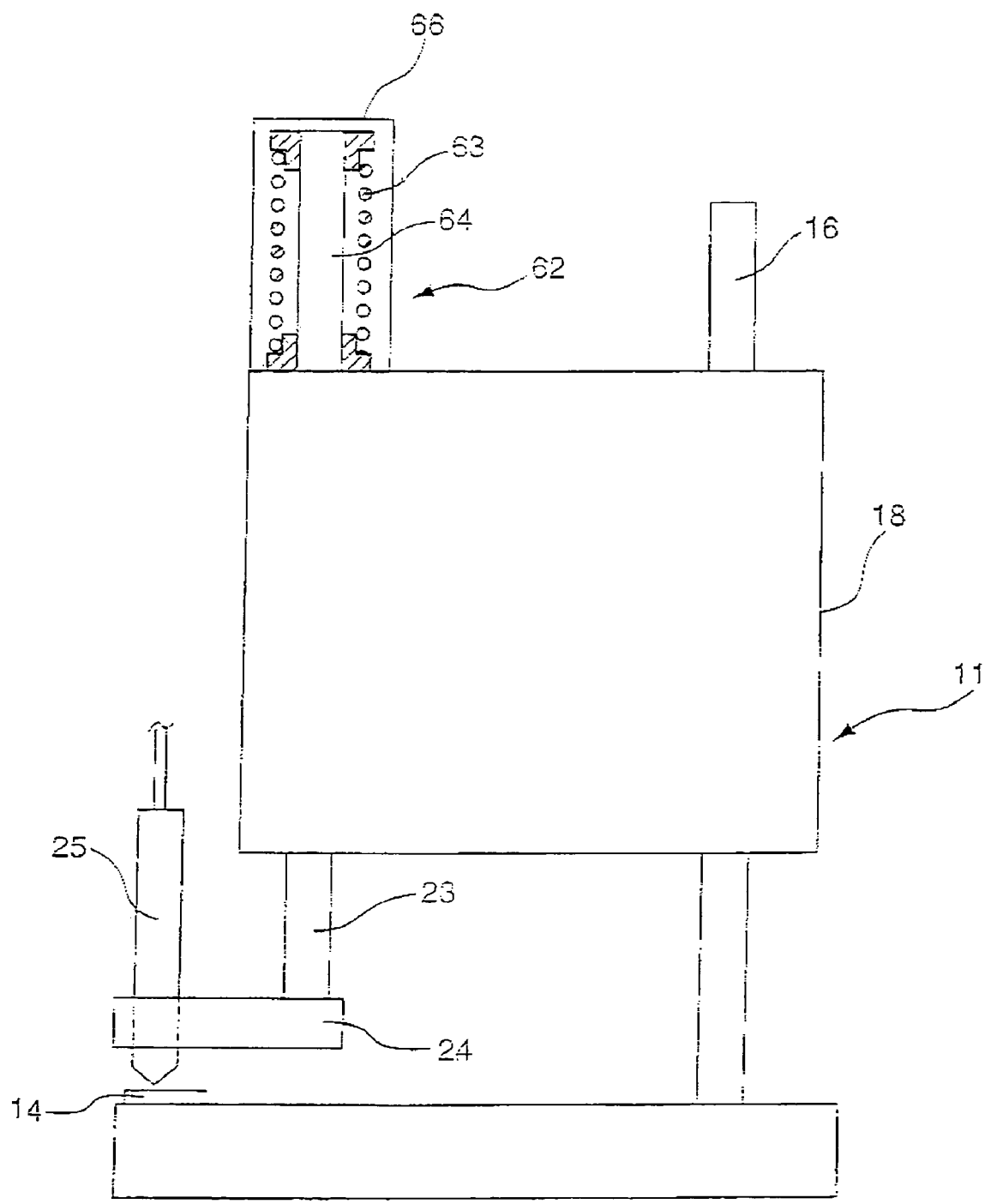
FIG. 6 is a schematic sectional view of an alternative executive form of the device according to the invention, comprising a pressure relief device.

FIG. 6 shows an alternative executive form of the invention. The column 23 is in communication with a pressure relief device 62. According to the executive form, the latter comprises a compression spring 63 which engages an extension 64 that can be attached to the cam follower 23. The extension 64 and the compression spring 63 are surrounded by a protective covering 66. The compression spring 63 is received in an end position with a bias. This biasing force is in relation to the weight of the measuring probe 25 which is received by the holding 24. This pressure relief device 62 ensures that it is even possible to move heavy measuring probes 25 up and down without having to enlarge an electric drive. Alternatively, a tension spring can be provided in the stead of the compression spring. This pressure relief device 62 can also be provided in relation to the selected leverage ratios of the drive unit 29. The leverage ratio of the executive form shown in FIG. 2 is 2:1. If the cam disk 38 immediately engages the cam follower, this ratio would be reduced to 1:1. In such a case, the pressure relief device 62 can act in a supporting manner, particularly while the cam follower 23 is in its up movement. Thereby, it is possible to achieve a reduced wear and a smooth running of the drive unit 29. At the same time, it is also possible to achieve reduced bearing forces while the down movement is in progress.

All elements are, as such, essential for the invention and can be combined with each other in any manner desired.

What is claimed is:

1. A measurement stand for holding a measuring device for measuring the thickness of thin layers, said measurement stand comprising a housing in which a cam follower is guided such that it is moved up and down and the measuring device is arranged at that end of said cam follower that faces the measuring object, characterized in that a drive unit with an electric drive drives the lifting movement of the cam follower, wherein said drive unit initiates in the down movement at least one first movement phase with a rapid motion and then at least one further movement phase with a creep motion of the cam follower until the measuring device touches down on the measuring object, wherein the drive unit comprises a cam disk which moves a pivoted lever up and down, said pivoted lever being arranged stationary in relation to the housing at one of its ends and forming a pivoted connection with the cam follower at its other end, and a roller running off the cam disk is provided between the pivot of the pivoted lever and the pivoted connection to the cam follower, wherein said pivot is stationary in relation to the housing, and wherein the cam disk is defined by a first curve trace for the first movement phase with a rapid motion and by a second curve trace that differs from the first curve trace for a further movement in the creep motion.

2. A measurement stand according to claim 1, characterized in that a constant feed speed is provided in the creep mode.

3. A measurement stand according to claim 1, characterized in that, owing to the pivoted lever, the roller running off the cam disk is running on a circular path which intersects or extends at least very closely to the pivot of the cam disk.

4. A measurement stand according to claim 1, characterized in that the cam disk is provided at a pivot of the drive unit, said pivot receiving a drive wheel and being driven by the electric drive.

5. A measurement stand according to claim 1, characterized in that a switching element with at least one switching plate is provided, said switching element limiting at least one upper and lower end position of the lifting movement of the cam follower.

6. A measurement stand according to claim 5, characterized in that at least two detectors, in particular optical sensors, detecting the upper and lower end positions of the lifting movements are provided along a circular path of the switching plate.

7. A measurement stand according to claim 6, characterized in that at least one further detector, in particular an optical sensor, is provided between the detectors detecting the upper and lower end positions.

8. A measurement stand according to claim 5, characterized in that, in order to further shorten the lifting movement in the rapid mode, further separate switching segments which are assigned to a further detector, in particular an optical sensor, are provided at the switching element.

9. A measurement stand according to claim 1, characterized in that the cam disk is provided at a pivot of the drive unit and further characterized in that a switching element is provided, the switching element being provided at the pivot receiving the cam disk.

10. A measurement stand according to claim 1, characterized in that the cam follower is moved up and down along the vertical and that a guide of the cam follower is provided at the upper and lower faces of the housing.

11. A measurement stand according to claim 10, characterized in that the guide is made of bearing bronze and that the surface of the cam follower is designed such that it is polished or lapped.

12. A measurement stand according to claim 1, characterized in that the pivoted connection between the cam follower and the pivoted lever is formed by a threaded pin which is guided in a deep hole of the pivoted lever.

13. A measurement stand according to claim 12, characterized in that the threaded pin receives a bearing bush which is guided in the deep hole.

14. A measurement stand according to claim 1, characterized in that the pivoted lever and the cam follower comprise an anti-twist device which particularly engages the housing.

15. A measurement stand according to claim 14, characterized in that the anti-twist device comprises a guiding groove in the housing, wherein a roller engaging the pivoted connection or the cam follower is guided in said guiding groove.

16. A measurement stand according to claim 1, characterized in that the cam follower comprises a pressure relief device at an end opposite to the measuring object.

17. A measurement stand according to claim 16, characterized in that the pressure relief device is a biased tension or compression spring which is in relation to the weight of the measuring device.

18. A measurement stand according to claim 1, characterized in that a lowering movement or an up movement of the cam follower is initiated manually.

19. A measurement stand according to claim 1, characterized in that a complete lift is initiated, wherein the dwell time in the touchdown position on the measuring object is set for taking the measurement.

20. A measurement stand according to claim 1, characterized in that a sequence of successive lifting cycles of the cam follower is set.

21. A measurement stand according to claim 1, characterized in that a continuous test with one lifting cycle of the cam follower is provided, wherein said continuous test is adjusted to the cycle times of the measuring objects in an automated handling process.

22. A measurement stand according to claim 1, characterized in that the lifting movement or the lifting cycle of the cam follower or both are initiated from an external control unit through an interface provided on the housing.

23. A measurement stand for holding a measuring device for measuring the thickness of thin layers, said measurement stand comprising a housing in which a cam follower is guided such that it is moved up and down and the measuring device is arranged at that end of said cam follower that faces the measuring object, characterized in that a drive unit with an electric drive drives the lifting movement of the cam follower, wherein said drive unit initiates in the down movement at least one first movement phase with a rapid motion and then at least one further movement phase with a creep motion of the cam follower until the measuring device touches down on the measuring object, wherein the drive unit comprises a cam disk, which moves the cam follower up and down and a roller is resting on the cam disk, which is provided at the cam follower, and wherein the cam disk is defined by a first curve trace for the first movement phase with a rapid motion and by a second curve trace that differs from the first curve trace for a further movement in the creep motion.

* * * * *